United States Patent [19]

Yokogawa

[11] Patent Number: 5,121,219
[45] Date of Patent: Jun. 9, 1992

[54] SPINDLE SERVO UTILIZING A VERTICAL SYNC MARK

[75] Inventor: Fumihiko Yokogawa, Saitama, Japan

[73] Assignee: Pioneer Electronic Corporation, Tokyo, Japan

[21] Appl. No.: 511,168

[22] Filed: Apr. 19, 1990

[30] Foreign Application Priority Data

Aug. 7, 1989 [JP] Japan .................................. 1-204491

[51] Int. Cl.⁵ .............................................. G11B 7/00
[52] U.S. Cl. .................................... 358/338; 358/322; 358/342; 369/44.25; 369/44.26
[58] Field of Search ............... 358/321, 322, 338, 342; 369/32, 50, 44.26, 44.25; 360/73.03

[56] References Cited

U.S. PATENT DOCUMENTS 4,736,238  4/1988  Moriyama et al. .................... 358/19
4,789,975  12/1988  Taniyama .............................. 369/50

Primary Examiner—Robert L. Richardson
Attorney, Agent, or Firm—Sughrue, Mion, Zinn, Macpeak & Seas

[57] ABSTRACT

In a disk recording/reproducing apparatus, phase control of a spindle servo system is made to be smaller than a range of time base control of a time base servo system, so as to obtain spindle servo phase jitter equivalent to that obtained using a horizontal synchronizing signal, which may not be available under all circumstances. Preferably, the range of phase control is no more than 1/10 of the range of variation of a variable delay line used to provide a time base reference signal.

4 Claims, 2 Drawing Sheets

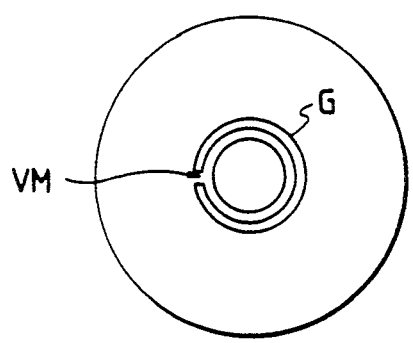
FIG. 1
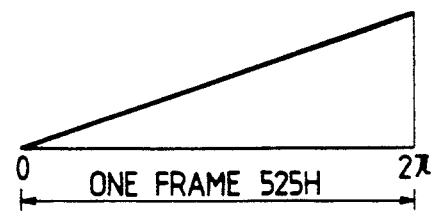
FIG. 2
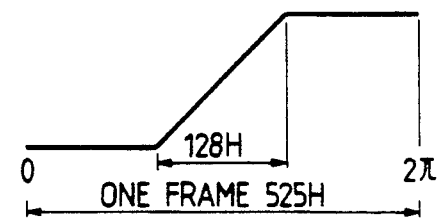
FIG. 3
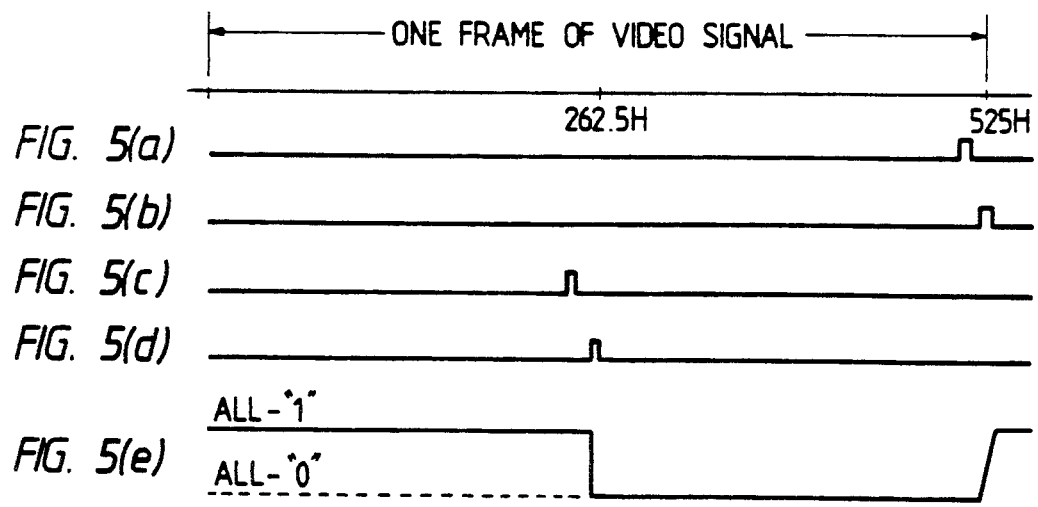

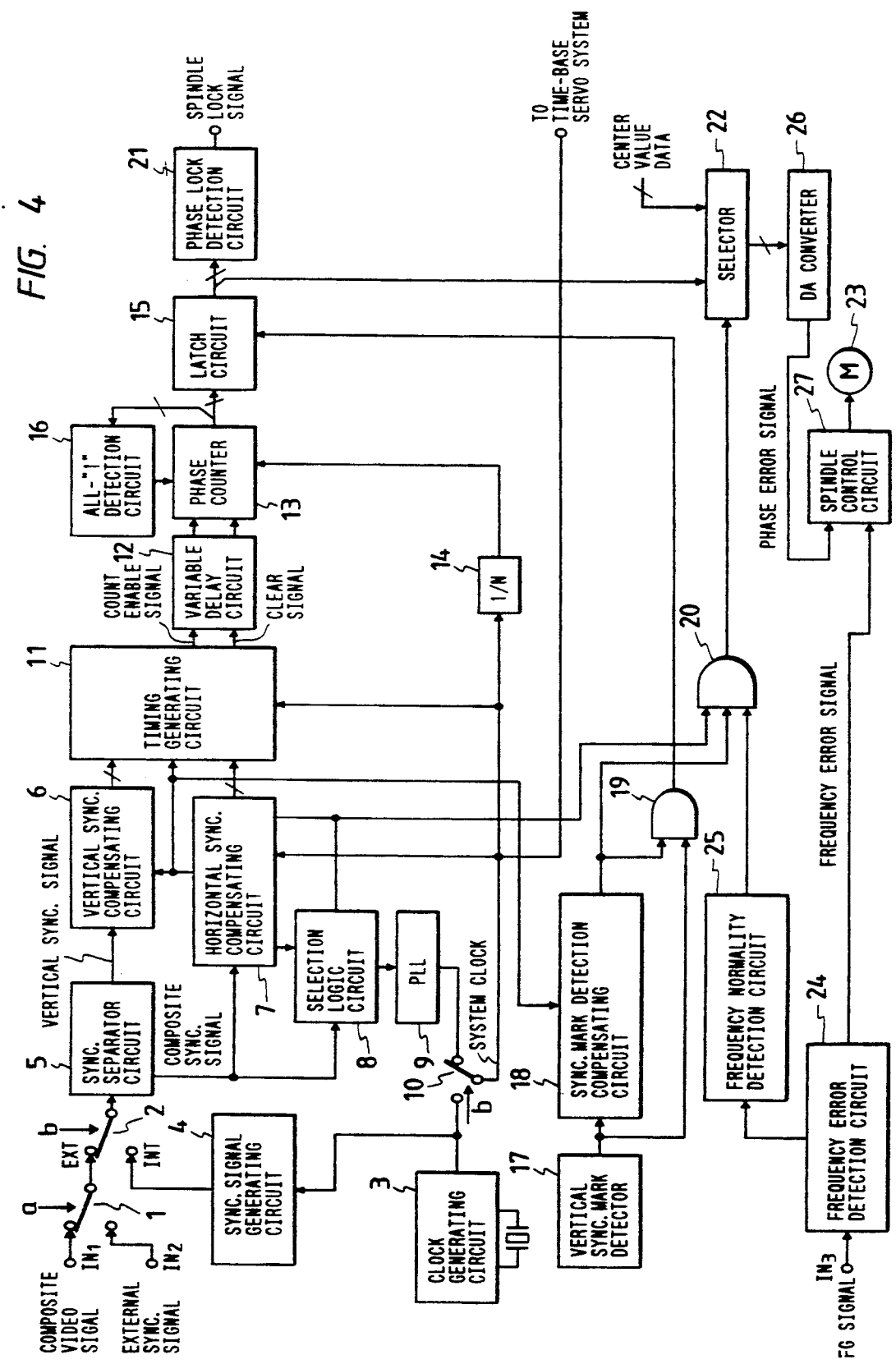

SPINDLE SERVO UTILIZING A VERTICAL SYNC MARK

BACKGROUND OF THE INVENTION

The present invention relates to a time base control device, and particularly to a time base control device in an optical disk recording/reproducing apparatus in which one frame of a composite video signal (including synchronizing signals such as a horizontal synchronizing signal, a vertical synchronizing signal, and the like) is recorded on each track on an optical disk (including an opto-magnetic disk and a phase-change type optical disk) having a vertical synchronizing mark, and the recorded signal on the optical disk is reproduced or erased.

In a conventional reproducing-only video disk player, since an optical disk to be played carries a composite video signal already recorded thereon, the composite video signal is read from the optical disk and demodulated, and a phase difference of a reproducing horizontal synchronizing signal included in the demodulated composite video signal relative to a reference horizontal synchronizing signal is detected. As a result, time base control is performed in accordance with the detected phase difference. In this time base control, a spindle servo system for performing rough adjustment of the time base control is given charge of the low band of the phase difference signal, and a time base servo system constituted by a variable delay line such as a CCD or the like for performing fine adjustment of the time base control is given charge of the high band of the phase difference signal.

Since the subject signal to be detected for the spindle servo system and for the time base servo system is one and the same and is a vertical synchronizing signal (one period thereof is 63.5 $\mu$sec), the low-band jitter of the spindle servo system falls within a range of about several $\mu$sec and does not increase beyond the range of time base control of the time base servo system, that is, the range of variation of the variable delay line such as a CCD, even considering the eccentricity of a disk.

On the other hand, in a system in which one frame of composite video signal is recorded on each track on an optical disk and the recorded signal is reproduced or erased, no composite video signal exists on the disk before recording. As a result, spindle servo control cannot be performed by use of a reproducing horizontal synchronizing signal, unlike the above-mentioned reproducing player. Accordingly, it is possible to configure a system such that a vertical synchronizing mark VM, made of a mirror portion where no pregroove G is cut, is provided for every rotation on a disk, for example, at its inner circumference (or at its outer circumference), as shown in FIG. 1, so that the vertical synchronizing mark VM is detected in recording operation to establish vertical synchronization.

In such a system, as shown in FIG. 2, one period of phase control becomes one frame (525H) and jitter in a range of about $2\pi/5250 = 0.07$ is required because the above-mentioned several $\mu$sec corresponds to about H/10. Assuming here that, for example, phase control is to be performed on 8 bits by use of a clock having a period which is twice as long as 1H, then a phase control signal such as is shown in FIG. 3 is obtained because $256 \times H/2 = 128H$. At this time, since one step is 0.5H, jitter is $\pm H/10$ or less.

SUMMARY OF THE INVENTION

Therefore, it is an object of the present invention to solve the above-mentioned problems in the prior art.

It is another object of the present invention to provide a time base control device for an optical disk recording/reproducing apparatus in which it is possible to obtain phase jitter of a spindle servo equivalent to that which will be obtained by use of a horizontal synchronizing signal, even where what is to be controlled is a vertical synchronizing signal detected once every rotation of a disk.

In order to attain the foregoing and other objects, in an optical disk recording/reproducing apparatus in which one frame of a composite video signal is recorded on each track on an optical disk having a vertical synchronizing mark and the recorded signal is reproduced or erased, the inventive time base control device includes a spindle servo system which detects the vertical synchronizing mark so as to generate a synchronizing mark detection signal and thus perform phase control on the spindle motor in accordance with a phase difference of the synchronizing mark detection signal from a time base reference signal. The system further includes a time base servo system which performs time base control of a composite video signal read out from the optical disk in accordance with a phase difference of a synchronizing signal in the read-out composite signal from a reference synchronizing signal, the resolution of the phase control of the spindle servo system being set to be smaller than a range of the time base control of the time base servo system.

In this configuration, it is possible to obtain phase jitter of spindle servo equivalent to that which will be obtained by use of a horizontal synchronizing signal, even where what is to be controlled is a vertical synchronizing signal detected once every rotation of a disk.

BRIEF DESCRIPTION OF THE DRAWINGS

Other features and advantages of the invention will be apparent from the following description taken in connection with the accompanying drawings, wherein:

FIG. 1 is a plan view of an optical disk having a vertical synchronizing mark;

FIG. 2 is a diagram for explaining the operation of the phase control on the basis of a vertical synchronizing mark detected in every rotation of the optical disk;

FIG. 3 is a diagram for explaining the case where the phase control on 8 bits is performed by use of a clock having a period which is two times as long as 1H;

FIG. 4 is a block diagram showing an embodiment of the spindle control device of an optical disk recording/reproducing apparatus according to the invention; and FIGS. 5(a) through 5(e) together comprise a timing chart for explaining the phase control operation.

DETAILED DESCRIPTION OF THE PREFERRED EMBODIMENT

Referring to the drawings, an embodiment of the time base control device of the optical disk recording/reproducing apparatus according to the invention now will be described.

FIG. 4 is a block diagram showing an embodiment of the time base control device according to the invention. The time base control device is provided with a spindle servo system for performing rough adjustment of the time base control and a time base servo system constituted by a variable delay line, such as a CCD or the like, for performing fine adjustment of the time base control. However, a known time base servo having a well known configuration may be used. Accordingly, only the configuration of the spindle servo system is illustrated in FIG. 4.

In FIG. 4, a composite video signal to be recorded is supplied to an input terminal $IN_1$, and an external synchronizing signal is supplied to another input terminal $IN_2$. Those input signals then are supplied to the two inputs of a selector 1, so that the selector 1 selects one of the two input signals supplied thereto in accordance with a switching control signal a, and supplies the selected signal to one of the two inputs of a selector 2. The selector 2 is supplied at its other input with a composite synchronizing signal generated as an internal synchronizing signal from a synchronizing signal generating circuit 4 on the basis of a master clock (internal reference clock) having a frequency of $4f_{sc}$ ($f_{sc}$ being a color subcarrier frequency) generated from a clock generating circuit 3. The selector 2 selects one of the input signals supplied thereto in accordance with a switching control signal b and outputs the selected signal. That is, the composite video signal is selected in recording the composite video signal, the external synchronizing signal is selected during external synchronization operation, and the internal synchronizing signal (the composite synchronizing signal) is selected during internal synchronization operation. The selected output signal of the selector 2 is supplied to a synchronizing separator circuit 5. A vertical synchronizing signal and the composite synchronizing signal are separated from each other in the synchronizing separator circuit 5, and are supplied to a vertical synchronization compensating circuit 6 and a horizontal synchronization compensating circuit 7, respectively.

The horizontal synchronization compensating circuit 7 recognizes existence of a synchronized condition and outputs a high level horizontal synchronization OK signal when an inside counter of the horizontal synchronization compensating circuit 7 has detected the horizontal synchronizing signal contained in the composite synchronizing signal a plurality of times in succession. The horizontal synchronization compensating circuit 7 also produces a horizontal synchronizing clock which is in synchronism with the horizontal synchronizing signal, and which has a frequency twice the frequency of the horizontal synchronizing signal on the basis of the count data of the inside counter.

The composite synchronizing signal also is supplied to a selection logic circuit 8. The horizontal synchronization OK signal and a timing gate signal which are produced from the horizontal synchronizing compensating circuit 7 also are supplied to the selection logic circuit 8. The selection logic circuit 8 allows the composite synchronizing signal to pass as it is so that the composite synchronizing signal is supplied to a PLL circuit 9 when the horizontal synchronization OK signal is not being supplied to the selection logic circuit 8, that is, when there is no horizontal synchronization. On the other hand, when the horizontal synchronization OK signal is being supplied to the selection logic circuit 8, that is, when there is horizontal synchronization, the selection logic circuit 8 extracts only the horizontal synchronizing signal from the composite synchronizing signal on the basis of the timing gate signal, and supplies the extracted signal to the PLL circuit 9. The PLL circuit 9 produces a reproducing clock which has a frequency of $4f_{sc}$ and which is in synchronism with the horizontal synchronizing signal. The specific circuit configuration of the horizontal synchronizing compensating circuit 7, the selection logic circuit 8, and the PLL circuit 9 and the operations of the respective circuits are disclosed in detail in the specification of Japanese Patent Application No. 1-111343.

The master clock having a frequency of $4f_{sc}$ generated by the clock generating circuit 3, and the reproducing clock having a frequency of $4f_{sc}$ generated by the PLL circuit 9 are supplied to the two inputs of a selector 10. In accordance with a switching control signal b, the selector 10 selects the master clock supplied from the clock generating circuit 3 during internal synchronization operation, and selects the reproducing clock supplied from the PLL circuit 9 during external synchronization operation, so that the selector 10 supplies the selected clock as a system clock to the horizontal synchronization compensating circuit 7 and a timing generating circuit 11, and to a phase counter 13 of the spindle servo system through a 1/N frequency divider 14. This system clock is supplied similarly to a time base servo system (not shown).

The count data of the inside counter of the vertical synchronizing compensating circuit 6, the horizontal synchronizing clock produced from the horizontal synchronization compensating circuit 7, the count data produced from a synchronization compensating counter, and the system clock are supplied to the timing generating circuit 11. The timing generating circuit 11 produces various kinds of timing signals, including a count enable signal and a clear signal to be supplied to a phase counter 13 which will be described later. After being delayed by a predetermined delay time by a variable delay circuit 12, the count enable signal and the clear signal are supplied to the phase counter 13. The phase counter 13 is enabled to perform counting only in a period in which the count enable signal is in a high level. When the phase counter 13 is supplied with the clear signal, the count data thereof is cleared so as to be in the state of all-"0". A system clock is frequency-divided by the 1/N frequency divider 14.

The count data of the phase counter 13 is supplied to a latch circuit 15 and to an all-"1" detection circuit 16. When the all-"1" detection circuit 16 detects that the count data of the phase counter 13 are in the state of all-"1", the all-"1" detection circuit 16 supplies a hold signal to the phase counter 13. Upon reception of the hold signal, the phase counter 13 stops its counting operation and holds count data in the state of all-"1" until the next clear signal is supplied thereto.

As shown in FIG. 1, a vertical synchronizing mark VM is provided on an optical disk every rotation of the disk. The vertical synchronizing mark VM is detected by a vertical synchronizing mark detector 17, such as a photocoupler or the like. A synchronizing mark detecting signal, a detection output of the vertical synchronizing mark detector 17, is supplied to a synchronizing mark detection compensating circuit 18, and also is supplied to one input of a two-input AND gate 19. Basically, the synchronizing mark detection compensating circuit 18 has the same structure as that of the horizontal synchronization compensating circuit 7.

Upon detection of the synchronizing mark detection signal a number of times in succession at predetermined intervals, the synchronizing mark detection compensating circuit 18 produces a high level synchronizing mark detection OK signal. On the other hand, upon detection of omission of the synchronizing mark detection signal a number of times in succession from predetermined windows after production of the last synchronizing mark detection OK signal, the synchronizing mark detection compensating circuit 18 stops producing the synchronizing mark detection OK signal.

The synchronizing mark detection OK signal is supplied to the other input of the AND gate 19 and also is supplied to one input of a three-input AND gate 20. The horizontal synchronizing OK signal produced from the horizontal synchronization compensating circuit 7 is supplied to another input of the AND gate 20.

When the synchronizing mark detection OK signal is produced from the synchronizing mark detection compensating circuit 18, the synchronizing mark detection OK signal is supplied as a latch signal to the latch circuit 15 through the AND gate 19. As a result, the count data of the phase counter 12 are latched at the timing of detection of the vertical synchronizing mark. The latched data are supplied as phase data to a phase lock detection circuit 21 and a selector 22. If the phase data is within a predetermined range, the phase lock detection circuit 21 judges that phase lock has been completed, and produces a spindle lock signal. Here, one horizontal synchronizing period is $$1H = f_{sc}\,33\,2/455 = 4f_{sc}/910$$

and the clock of the phase counter is $4f_{sc}/N$. Accordingly, the resolution of the phase control is expressed by $$\frac{N}{910}H.$$

A frequency generator (FG) for detecting motor speed is mounted on a spindle motor 23 for driving a disk to rotate. An FG signal produced from the frequency generator as speed information is supplied to a frequency error detection circuit 24 through an input terminal $IN_3$. The frequency error detection circuit 24 detects a speed error of the spindle motor 23 relative to a reference speed on the basis of the FG signal, and produces a frequency error signal representing the error. Further, a frequency normality detection circuit 25 judges whether the level of the frequency error signal is within a predetermined range. When the level of the frequency error signal is within the predetermined range, the frequency normality detection circuit 25 concludes that the frequency is normal, and produces a frequency OK signal. The frequency OK signal is supplied to the remaining input of the three-input AND gate 20.

The AND gate 20 produces an output when all of the synchronizing mark detection OK signal, the horizontal synchronization OK signal, and the frequency OK signal are supplied to the AND gate 20. The output of the AND gate 20 is supplied to the selector 22 as a switching control input thereto. As a result, the selector 22 selects the phase data latched in the latch circuit 15 upon generation of the output of the AND gate 20, and supplies the selected data to a digital-to-analog (D/A) converter 26 in the following stage. When no output is produced from the AND gate 20, the selector 22 selects data corresponding to a center value of the D/A converter 26 and outputs the selected data. The output of the D/A converter 26 is a phase error signal. That is, the phase error signal is output only under the condition that there is horizontal synchronization, the vertical synchronizing mark is normally detected, and the FG frequency is within the predetermined range. The frequency error signal and the phase error signal are supplied to a spindle control circuit 27 to make the spindle control circuit 27 perform the phase control of the spindle motor 23.

Referring to a timing chart in FIGS. 5(*a*) through 5(*e*), the operation of the phase control now will be described.

One frame of composite video signal is recorded every rotation of a disk, that is, in each track of the disk. A count enable signal, shown in FIG. 5(*a*), and having a pulse width of several H-periods is produced by the timing generating circuit 11 within a predetermined range in every frame. The count enable signal is delayed by the variable delay circuit 12 to become a delayed enable signal, as shown in FIG. 5(*b*). The delayed enable signal is supplied to the phase counter 13. The phase counter 13 is placed in the count-enabled state in the period in which the level of the delayed enable signal is high so as to perform its count operation. On the other hand, a clear signal, shown in FIG. 5(*c*), is produced by the timing generating circuit 11 at a position shifted by one field (½ frame) from the count enable signal, shown in FIG. 5(*a*), the clear signal is delayed by the variable delay circuit 12, and the delayed clear signal shown in FIG. 5(*d*) is supplied to the phase counter 13. However, if the quantity of delay made by the variable delay circuit 12 is not so large, it is not always necessary to delay the clear signal. The count data of the phase counter 13 is cleared in accordance with the delayed clear signal shown in FIG. 5(*d*).

As a result, count data shown in FIG. 5(*e*) of the phase counter 13, indicated in the form of an analog mode, is made to be in the state of all-"0" in accordance with the delay clear signal shown in FIG. 5(*d*), increases progressively with clock frequency by the application of the delayed enable signal shown in FIG. 5(*b*), and is maintained in the state of all-"1" during a period from when the count data is made to be in the state of all-"1" to the application of the next delayed clear signal. That is, the count data has a form of a trapezoidal wave, as shown in FIG. 5(*e*). The slant portion of the trapezoidal wave of the count data is used as a time base reference signal which is in synchronism with a composite video signal to be recorded, and which is generated at a predetermined position on the time base. Accordingly, in the case where phase control is performed with this trapezoidal wave, phase pull-in is performed at the slant portion of the trapezoidal wave, and, as described above, the resolution of the phase control is expressed by $$\frac{N}{910}H$$

(where $1H \approx 63.5\mu sec$).

For example, if $N=8$ here, the resolution becomes $0.56\,\mu sec$. This resolution is sufficiently smaller than the range of time base control of the time base servo system, that is, the range of variation of the variable delay line such as a CCD or the like. It is preferable to set the resolution to be a value not larger than 1/10 of the range of variation of the variable delay line.

Thus, if the resolution of the phase control of the spindle servo system is made to be smaller than the range of time base control of the time base servo system, preferably to be not larger than 1/10 of the range of variation of the variable delay line, it is possible to obtain phase jitter of the spindle servo equivalent to that which will be obtained by use of a horizontal synchronizing signal, even in the case where the object to be controlled is a vertical synchronizing signal detected once every rotation of a disk.

Further, the configuration is such that the selector 10 selects the clock generated in the PLL circuit 9 in synchronism with an externally supplied synchronizing signal or, for example, a vertical synchronizing signal in an external composite video signal during external synchronization operation. Alternatively, the selector 10 selects the internal reference clock generated in the clock generating circuit 3 during internal synchronization operation, the selected clock being supplied as a system clock to the spindle servo system and the time base servo system. Accordingly, the spindle servo system and the time base servo system always are synchronized with each other, even during external synchronization operation. During external synchronization operation, therefore, both servo systems do not come out of synchronization, and there is no displacement of the operating point of the time base servo system, so that the time base servo comes out at last.

As described above, in an optical disk recording/reproducing apparatus in which one frame of a composite video signal is recorded on each track on an optical disk having a vertical synchronizing mark and the recorded signal is reproduced or erased, the inventive time base control device is configured such that the resolution of the phase control of the spindle servo system is set to be smaller than the range of time base control of the time base servo system. Accordingly, it is possible to obtain phase jitter of spindle servo equivalent to that which will be obtained by use of a horizontal synchronizing signal even in the case where the object to be controlled is a vertical synchronizing signal detected once every rotation of a disk.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. In an optical disk recording/reproducing apparatus in which one frame of a composite video signal is recorded on each track on an optical disk having a vertical synchronizing mark, and the recorded signal is reproduced or erased, a time base control device comprising:
   a spindle motor for driving said optical disk to rotate;
   means for producing a time base reference signal;
   first control means for detecting said vertical synchronizing mark to generate a synchronizing mark detection signal and for performing phase control on said spindle motor in accordance with a phase difference of said synchronizing mark detection signal from said time base reference signal; and
   second control means for performing time base control of said composite video signal read out from said optical disk in accordance with a phase difference of a synchronizing signal in said read-out composite signal from a reference synchronizing signal,
   resolution of the phase control of said first control means being set so as to be smaller than a range of the time base control of said second control means.

2. A spindle control device according to claim 1, further comprising:
   first clock generation means for generating a clock in synchronism with one of an externally supplied external synchronizing signal and a synchronizing signal in an external composite video signal;
   second clock generation means for generating an internal reference clock; and
   means for supplying a selected one of the clock generated by said first clock generation means and the internal reference clock generated by said second clock generation means to said first and second control means.

3. A spindle control device according to claim 1, wherein said time base reference signal control means includes means for imposing a variable delay on said time base reference signal, a range of variation of said variable delay being greater than said resolution of said first control means.

4. A spindle control device according to claim 3, wherein said resolution of said first control means is not larger than 1/10 of the range of variation of said variable delay.

* * * * *